July 25, 1967  E. MANDLER  3,332,331
PHOTOCELL ARRANGEMENT IN SINGLE-LENS REFLEX CAMERA
Filed Aug. 9, 1965  2 Sheets-Sheet 1

INVENTOR
ERICH MANDLER
BY Spencer & Kaye
Attorneys

July 25, 1967  E. MANDLER  3,332,331
PHOTOCELL ARRANGEMENT IN SINGLE-LENS REFLEX CAMERA
Filed Aug. 9, 1965  2 Sheets-Sheet 2

INVENTOR
ERICH MANDLER
BY Spencer & Kaye
Attorneys

United States Patent Office 3,332,331
Patented July 25, 1967

3,332,331
PHOTOCELL ARRANGEMENT IN SINGLE-LENS REFLEX CAMERA
Erich Mandler, Waldgrimes, Kreis Wetzlar, Germany, assignor to Ernst Leitz G.m.b.H., Wetzlar, Germany
Filed Aug. 9, 1965, Ser. No. 478,117
Claims priority, application Germany, May 14, 1965, L 50,711
5 Claims. (Cl. 95—42)

The present invention relates to cameras, and, more particularly, to a light meter arrangement for a single-lens reflex camera, especially a camera which is equipped with a plurality of interchangeable objective lenses.

As is well known in the art, the exposure time is best determined by measuring the light through the objective lens, inasmuch as this inherently takes into consideration the angular field picked up by the lens, and there exist single-lens reflex cameras in which the hinged mirror, i.e., the mirror which is pivotable into and out of an operative position in which it lies between the objective lens and the film and in which it reflects the light coming through the objective lens onto a focusing screen, such as a ground glass plate, is fashioned as a beam divider, with so much of the light which passes through the mirror being used for measuring the light. Such a camera has a number of drawbacks. For one thing, the light-sensitive element which is used to pick up the light passing through the mirror has to have a relatively large area. Furthermore, the light-sensitive element must be arranged as near as possible to the plane of the film and must, prior to the taking of a picture, be moved out of the path of the light beam which enters the camera through the objective lens and impinges upon the film.

Other attempts in this direction have resulted in a camera in which a surface of the deviation prism which is conventionally arranged in the path of the view finder light beam is provided with a partly reflective coating and to position the light-sensitive element behind this coating.

In another single-lens reflex camera, a flat mirror is provided in the field lens which is arranged near the focusing screen, this flat mirror being inclined with respect to the optical axis and serving laterally to deflect a portion of the view finder light beam onto a light-sensitive element which is arranged next to the field lens.

All of the above-described devices have the drawback that the light measurement is not independent of the focal length and the largest aperture of the individual objective lenses which are to be used with the camera. Furthermore, the light-sensitive element has to have a large area in order to enable it to pick up a sufficiently large portion of the image, for otherwise the individual image points will not contribute uniformly to the measurement being taken.

It is, therefore, the primary object of the present invention to provide a light meter arrangement for a single-lens reflex camera which overcomes the above drawbacks and, with this object in view, the present invention resides, basically, in a light meter arrangement for a reflex camera having objective lens means and finder means, which light meter arrangement comprises a light-sensitive element, a frame carrying a partly reflective beam divider mirror, and a concave mirror pivotally mounted on the frame. The frame is hingedly mounted on the camera for pivotal movement into and out of an operative position in which the beam divider mirror lies in the path of the light rays coming through the objective lens means and reflects part of the rays toward the finder means. Also, means are provided which coact with the frame and the concave mirror for causing the latter, when the frame is in its operative position, to lie in the path of light rays not reflected by the beam divider mirror and to occupy a position in which the concave mirror reflects the light rays it receives onto the light-sensitive element. The radius of curvature of the concave mirror and the distance between the concave mirror and the light-sensitive element, when the concave mirror lies in the mentioned position, is such that a light beam that transmits the image of the light-sensitive element into the space occupied by the objective lens means does not intersect the exit pupil of the objective lens means.

Additional objects and advantages of the present invention will become apparent upon consideration of the following description when taken in conjunction with the accompanying drawings in which.

Figure 1:
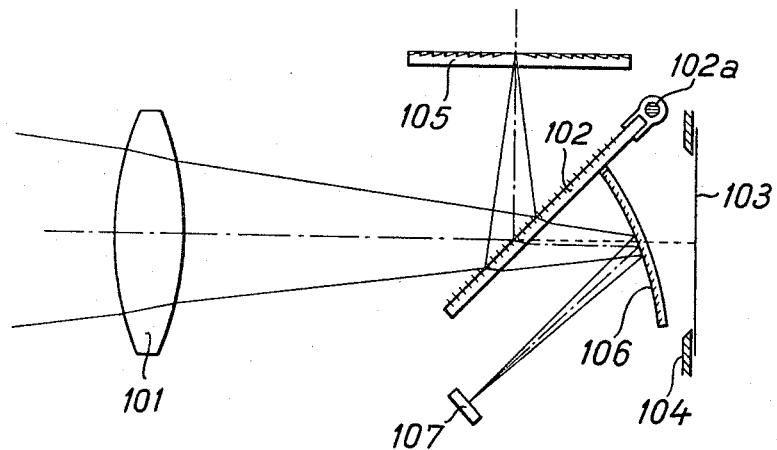
FIGURE 1 is a schematic elevation of a camera in accordance with the present invention.

Referring now to the drawings and first to FIGURE 1 thereof, the same shows the basic components of a single-lens reflex camera according to the present invention. These components include an objective lens 101 through which the light beam enters the camera from the outside, and a hinged mirror 102 which itself is a partial mirror, i.e., a mirror which is provided with a mirror coating that is partly light-permeable so as to enable the mirror to serve as a beam divider. This is depicted symbolically by short right angle lines crossing the surface of the mirror. The mirror 102 is pivotally mounted, in a manner conventional in single-lens reflex cameras, the pivotal mounting being shown schematically at 102a. When the mirror 102 is in the "operative" position shown in FIGURE 1, it reflects part of the light beam coming through the objective lens 101 onto the finder means or focusing screen 105, e.g., a Fresnel lens, thereby to form an image of the object being photographed (not shown) in the image plane of the focusing screen 105. The film 103 is passed behind a film holder 104 which positions the film 103 in the focal plane.

Arranged between the mirror 102 and the film holder 104 is a concave mirror 106, the full-mirror characteristics of which are depicted, symbolically, by short oblique lines ending at the mirror surface. This concave mirror 106, which may be a Fresnel mirror, reflects onto a light-sensitive element 107, such as a photo-resistor, that portion of the light beam coming through the exit pupil of the objective lens 101 which, as the result of the beam division, is taken out of the path of the light rays going to the screen 105, i.e., that portion of the light which is passed by the partly reflective mirror 102. The mirror 106 is pivotally connected to the mirror 102 such that both the mirror 102 and the mirror 106 can be moved to an inoperative position, i.e., out of the path of a light beam coming from the objective lens 101 and going to the film 103.

The radius of curvature of the concave mirror 106 and the distance which the light-sensitive element 107 is spaced from this mirror are such that the beam of light which reproduces the light-sensitive element, with the help of the concave mirror, within the space occupied by the objective lens 101, does not intersect the exit pupil of the lens.

If the camera is designed for use with a plurality of interchangeable objective lenses, the radius of curvature of the concave mirror and the distance between this concave mirror and the light-sensitive element is such that none of the light beams that transmit the image of the ligh-sensitive element into the space occupied by any one of the interchangeable objective lenses intersects the exit pupil of any of the objective lenses.

Figure 2:
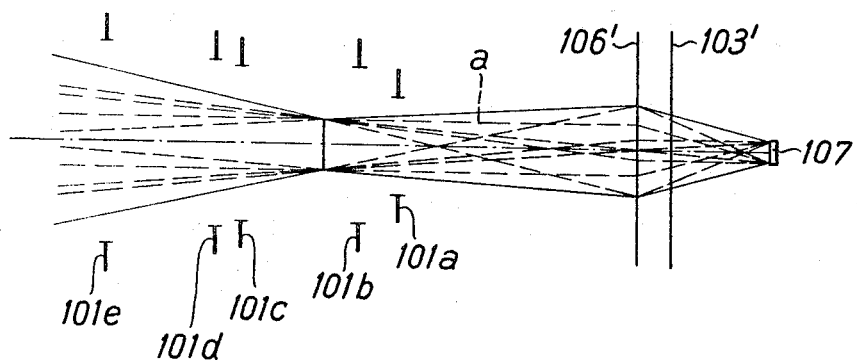
FIGURE 2 is a schematic illustration showing the light beams which produce the images of the light-sensitive element in the space occupied by any one of several interchangeable objective lenses which may be used with the camera.

This is depicted diagrammatically in FIGURE 2, in which the light sensitive element is shown at 107 and the light beams which depict the element 107 in the space occupied by any one of the objective lenses are shown at a. For schematic reasons, the concave mirror is shown as having been replaced by a light-refracting surface 106'. FIGURE 2 shows the exit pupils 101a, 101b, 101c, 101d and 101e of five different objective lenses having different focal lengths, and it will be seen that the light beams a clear, i.e., do not intersect, the repective exit pupils.

By virtue of the above arrangement, the exit pupil of at least one objective lens, of given focal length, can be reproduced exactly on the light-sensitive element, while such inaccuracies as result when the exit pupils of other objective lenses having different focal lengths are reproduced will be at least susbtantially compensated due to their opposing effects.

FIGURE 2 also shows the position of the film plane 103' relative to the exit pupils of the different objective lenses.

The precise radius of curvature of the concave mirror and the precise distance which the light-sensitive element is spaced from the mirror may readily be determined empirically. In one actual embodiment, the radius of curvature of the concave mirror was 40 mm. and the distance between the mirror and the light-sensitive element was 24 mm.

Figure 3:
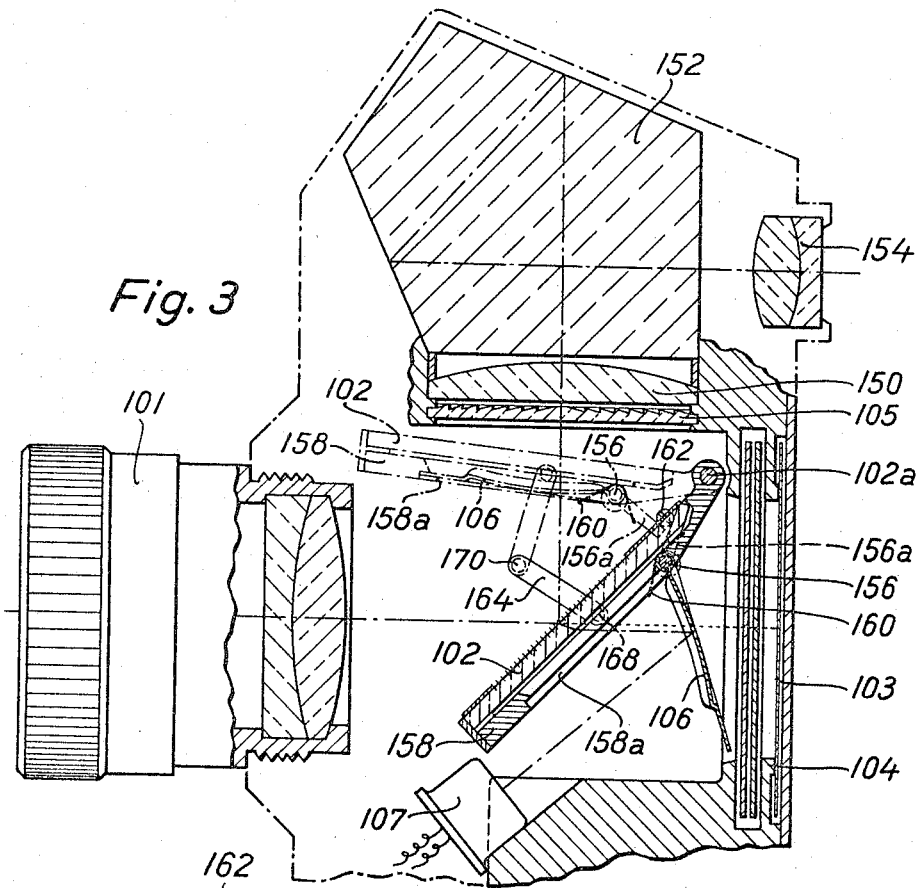
FIGURE 3 is a sectional elevational view of the camera according to the present invention.
Figure 4:
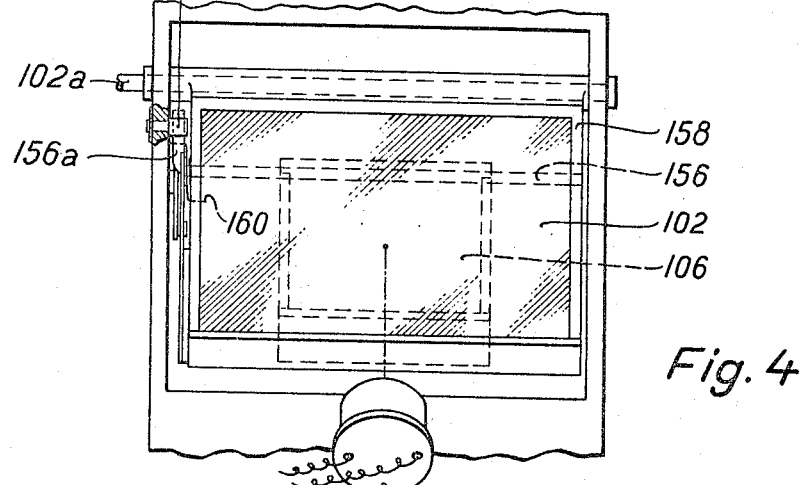
FIGURE 4 is a plan view of the camera shown in FIGURE 3.

FIGURES 3 and 4 show the detailed structure of the light meter arrangement of the camera according to the present invention, including the manner in which the concave mirror 106 is pivotally connected to the beam divider mirror 102, and also the manner in which the concave mirror 106 is pivoted out of its operative position not only with respect to the camera housing but also with respect to the beam divider mirror 102. Thus, FIGURES 3 and 4, besides showing the above-described parts 101 through 107 and the view finder optic system comprising a field lens 150, a pentaprism 152 and a finder lens 154, also show the shaft 102a on which the mirror 102 is pivotally mounted. The concave mirror 106 is non-rotatably secured to a shaft 156 which is rotatably mounted on the frame 158 of the mirror 102. One end 156a of the shaft 156 is angled and, under the influence of a spring 160, bears against an abutment pin 162 which is secured to the camera housing. FIGURE 3 also shows a link 164, one end of which is pivotally connected, at 168, to the frame 158 of the mirror 102, the other end of this link being secured to a shaft 170, which may be rotated from outside of the camera.

The mechanism operates as follows:

When the parts are in the positions shown, in FIGURE 3, in solid lines, in which the mirror 102 reflects part of the light coming through the objective lens 101 toward the screen 105 and the finder optic, the concave mirror 106 is maintained in the path of the light that passes through the mirror 102, by means of the spring 160 which itself is interposed between the frame 158 of mirror 102 and the bent end 156a of shaft 156. The light reflected by the mirror 106 is thus reflected toward the light-sensitive element 107.

If the shaft 170 is then rotated and the mirror 102 pivoted from the operative position shown in solid lines into the inoperative position shown in phantom lines, the bent end 156a will cam against the pin 162 so that the shaft 156, and with it the mirror 106, will be pivoted relative to the frame 158 against the action of the spring 160, such that when the mirror 102 is out of the path of the light beam coming into the camera through the objective lens 101, the mirror 106 will not only have been carried along by the pivoting of the frame 158, but will also have pivoted with respect to that frame until the mirror 106 is nested within a recess 158a that is provided on the rear side of frame 158. In this way, the mirror 106, too, will be out of the path of the light beam coming in through the objective lens 101.

The nesting of the mirror 106 within the frame 158 carrying the mirror 102 may be utilized to advantage by so dimensioning the mirror 106 and the recess 158a that the mirror 106 closes off the recess completely, thereby to shut out any light which might otherwise penetrate through the partly light-permeable mirror 102 into the interior of the camera through the finder optic.

For adjustment purposes, the pin 162 may be adjustably mounted on the side wall of the camera.

It will be understood that the above description of the present invention is susceptible to various modifications, changes and adaptations, and the same are intended to be comprehended within the meaning and range of equivalents of the appended claims.

What is claimed is:

1. A light meter arrangement for a reflex camera having objective lens means and finder means, said light meter arrangement comprising, in combination:

(a) a light-sensitive element;

(b) a frame carrying a partly reflective beam divider mirror, said frame being hingedly mounted on the camera for pivotal movement into and out of an operative position in which said beam divider mirror lies in the path of the light rays coming through the objective lens means and reflects part of said light rays toward the finder means;

(c) a concave mirror pivotally mounted on said frame; and (d) means coacting with said frame and said concave mirror for causing said concave mirror, when said frame is in said operative position thereof, to lie in the path of light rays not reflected by said beam divider mirror and to occupy a position in which said concave mirror reflects the light rays it receives onto said light-sensitive element;

(e) the radius of curvature of said concave mirror and the distance between said concave mirror and said light-sensitive element, when said concave mirror lies in said position thereof, being such that a light beam that transmits the image of said light-sensitive element into the space occupied by the objective lens means does not intersect the exit pupil of the objective lens means.

2. The combination defined in claim 1 wherein the concave mirror is pivotally mounted on said frame by a shaft which is itself rotatably mounted on said frame and to which said concave mirror is non-rotatably connected, and wherein said means (d) comprise an angled end portion of said shaft, an abutment carried by the camera and a spring for urging said end portion of said shaft into engagement with said abutment, said abutment being positioned for camming said end portion of said shaft, upon movement of said frame out of its operative position, to pivot said shaft, and with it said concave mirror, with respect to said frame out of the path of light rays coming into the camera through the objective lens means.

3. The combination defined in claim 2 wherein said frame is provided with a recess, and wherein said concave mirror is pivoted into said recess of said frame when said frame is wholly out of its operative position.

4. The combination defined in claim 3 wherein, when said frame is wholly out of its operative position, said concave mirror completely closes off said recess, thereby to prevent the entry of light into the interior of the camera from the finder means through said partly reflective mirror.

5. The combination defined in claim 1 wherein the objective lens means of the camera includes a plurality of interchangeable objective lenses and wherein the radius of curvature of said concave mirror means and the distance between said concave mirror means and said light-sensitive element is such that none of the light beams that transmit the image of said light-sensitive element into the space occupied by any one of the interchangeable objective lenses intersects the exit pupil of any of the objective lenses.

References Cited

UNITED STATES PATENTS 3,093,044   6/1963   Lederer _____ 95—10
3,127,809   4/1964   Denk _____ 95—42 X JOHN M. HORAN, *Primary Examiner.*